United States Patent [19]

Auerbach

[11] 4,298,982
[45] Nov. 3, 1981

[54] FAULT-TOLERANT INTERFACE CIRCUIT FOR PARALLEL DIGITAL BUS

[75] Inventor: Victor Auerbach, Hamilton Square, N.J.

[73] Assignee: RCA Corporation, New York, N.Y.

[21] Appl. No.: 156,264

[22] Filed: Jun. 3, 1980

[51] Int. Cl.³ .......................................... G06F 11/00
[52] U.S. Cl. .................................... 371/30; 371/24; 371/67
[58] Field of Search .................. 371/22, 24, 30, 48, 371/57, 67; 364/200, 900

[56] References Cited

U.S. PATENT DOCUMENTS

| | | | |
|---|---|---|---|
| 3,248,721 | 4/1966 | Cockrell et al. | 371/25 |
| 3,633,016 | 1/1972 | Walker et al. | 371/24 |
| 3,646,453 | 2/1972 | Garcia | 328/118 |
| 3,944,975 | 3/1976 | Yasumoto et al. | 371/24 |
| 3,961,203 | 6/1976 | Hutch | 371/55 |
| 3,999,126 | 12/1976 | Gabor | 324/133 |
| 4,020,460 | 4/1977 | Jones et al. | 371/57 |
| 4,070,648 | 1/1978 | Mergenthaler et al. | 371/70 |
| 4,088,876 | 5/1978 | Rege | 371/57 |

OTHER PUBLICATIONS

Sellers et al., Error Detecting Logic for Digital Computers, McGraw-Hill Book Co., 1968, pp. 85-92.

*Primary Examiner*—Charles E. Atkinson
*Attorney, Agent, or Firm*—Samuel Cohen; Robert L. Troike; Donald W. Phillion

[57] ABSTRACT

A system for detecting and correcting a stuck condition on the bus lines of a parallel multi-channel data transmission system. The system comprises a transmitter for generating N data signal having first and second logic levels, a receiver for receiving said N signals, and a plurality of N data channels connecting said transmitter with said receiver. Each data channel comprises first and second Exclusive OR (XOR) gate means each having first and second input means and an output means. A data input signal is supplied to the first input means of said first XOR gate and the output of the second XOR gate is supplied to said receiver. Bus line means connects the output means of said first OR gate to the first input means of said second XOR gate. Logic means responds to unequal signal logic levels on the bus means and the data signal of any of said data channels to supply a first signal logic level to the second input means of all of said first and second XOR gates such that the signal logic level supplied to the first input means of said first and second XOR gate will be inverted. The logic means further responds to equal signal logic levels of said bus means and said data input signals of all of said data channels to supply a non-inverting signal logic level to the second input means of all of said first and second XOR gates.

10 Claims, 8 Drawing Figures

FAULT-TOLERANT INTERFACE CIRCUIT FOR PARALLEL DIGITAL BUS

This invention relates generally to means for detecting and correcting errors in the transmission of digital signals and more specifically to a circuit for automatically detecting and correcting errors due to "stuck" type failures.

A stuck type failure in a communication system is one wherein a two-level signal is being transmitted over a wire (bus) or other signal line and some failure occurs in the circuit whereby the signal on said line becomes forced to remain either in its high level state or in its low level state, a condition referred to herein as a "stuck" condition. For example, if the system is servicing a large number of peripheral devices and the data is being transmitted in parallel via an 8 data line bus, it is possible that one of the data lines will become short-circuited to ground in the wiring harness or transmission cable, or within one of the peripheral devices. If ground potential is the low level signal state then when a high level signal transmission is attempted by a transmitting peripheral device, it will be grounded by the short circuit and will appear as a low level signal at any receiving peripheral device unless means are provided to detect and correct the error. A stuck condition can also occur at the high level of a data bus line in that such a data line might become connected permanently to a high level voltage source in one of the peripheral devices. Thus when a low level signal is supposed to appear on that data line it will in fact appear as a high level signal. Another possible cause of a data line being stuck is the failure in an amplifier or driver component within one of the peripheral devices of the system, causing it to attempt to drive the bus line when it should be in a "gated-off" condition. It is apparent that in a complex system, wherein many peripheral devices are connected to the common wire or bus, a stuck failure in any one of the peripheral devices, on any one of the data bus lines may degrade the entire system. Also, the likelihood of such a failure increases in proportion to the number of devices and the number of lines.

It is to be understood that the definition of a "stuck" condition in the context of this specification does not include an open circuit whereby the signal is blocked from transmission by a failure of electrical continuity. Such failures may be readily circumvented by redundant wiring techniques well known in the art. A stuck condition is limited to a condition where the voltage on one of data lines is stuck at some voltage which is usually the low level or the high level value of the signal although it can be some value in between. The identical stuck voltage appears at all peripheral devices connected to the data line.

There are well-known techniques in the art for detecting and correcting errors in transmitted signals including stuck conditions. For example, Hamming's work defines some of such techniques. However, these known techniques are relatively complex, require considerable logic to detect and correct a single error, and often require a large increase in the number of data lines. Other means are provided in the art for detecting and correcting errors which result in the cessation of operation of the equipment.

The present invention provides an inexpensive and reliable means for detecting and correcting a stuck condition on a single data line without halting the operation of the system.

In a preferred form of the invention there is provided, in a system comprising a transmitter for generating N data signals having first and second logic levels and a receiver for receiving said N signals, a plurality of N data channels connecting said transmitter with said receiver. Each data channel comprises first and second Exclusive OR (XOR) gates with each having first and second input means and an output means. A data input signal is supplied to the first input means of said first XOR gate and the output of the second XOR gate is supplied to said receiver. Bus means connect the output means of said first XOR gate to the first input means of said second XOR gate. Logic means responds to unequal signal logic levels on the bus means and the data input signal of any of said data channels to supply a first signal logic level to the second input means of all of said first and second XOR gates such that the signal logic levels supplied to the first input means of all of said first and second XOR gates will be inverted. The logic means further responds to equal signal logic levels of said bus means and said data input signals of all of said data channels to supply a non-inverting signal logic level to the second input means of all of said first and second XOR gates.

Figure 1:
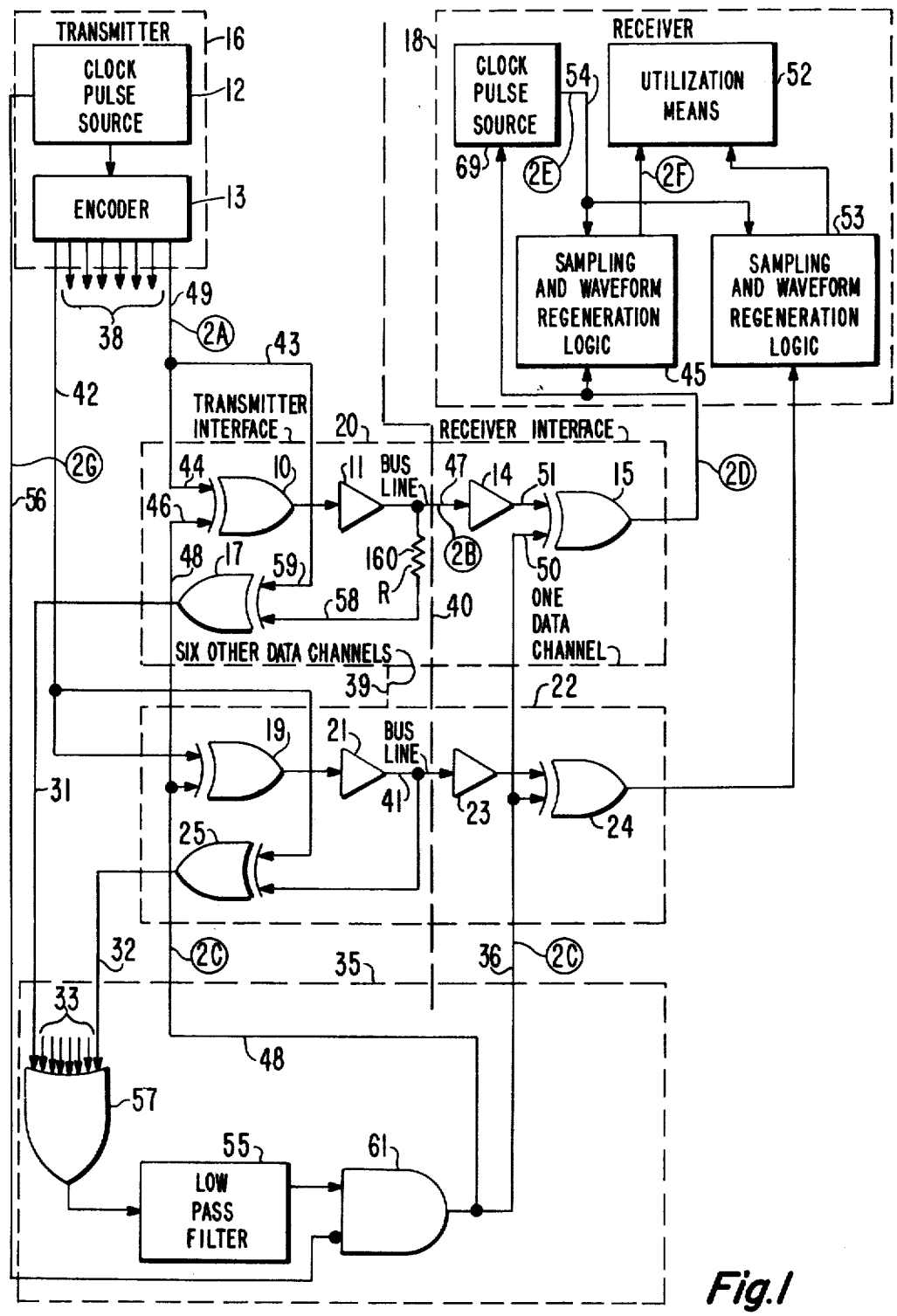
FIG. 1 shows a combined block and logic diagram of one form of the invention.

Referring now to FIG. 1 a transmitter 16 comprising an encoder 13 under control of a clock source 12 transmits a multi-bit two-level data word through data channels, such as data channels designated generally as dotted blocks 20 and 22 to a receiver 18. In the example shown, eight such data channels are required to carry an 8 bit data word from the transmitter 16 to the receiver 18. The logic comprising only two of these data channels is shown within the dotted blocks 20 and 22. The six additional data channels, identical to the data channels 20 and 22, are represented generally by the dotted line 39, but are not shown explicitly.

The eight data channels are identical so that it will be necessary to describe in detail only one of such data channels, specifically the channel shown in block 20, it being understood that such description is also applicable to the other seven data channels including the one shown in the dotted block 22, and the six represented by dotted line 39. The logic within the dotted block 35 is a ninth data channel which is different from the other eight data channels as will be described in detail later.

Returning to data channel 20 it can be seen that it is divided into two portions by vertical dotted line 40. The portion to the left of dotted line 40 is identified herein as a transmitter interface and the portion to the right of dotted line 40 as a receiver interface. The transmitter interface of data channel 20 consists of two Exclusive OR gates 10 and 17 and a bus driver or amplifier 11. The receiver interface of the data channel 20 consists of an Exclusive OR gate 15 and another bus driver or amplifier 14. The transmitter and receiver interfaces are connected together by a bus line 47 which is presumed to be vulnerable to a stuck condition and on which said stuck condition is detected if and when it occurs.

The Exclusive OR gates 19, 25 and 24 of data channel 22 correspond to the Exclusive OR gates 10, 17 and 15, respectively, of data channel 20. Amplifiers 21 and 23 of data channel 22 correspond, respectively, to amplifiers 11 and 14 of data channel 20. Exclusive OR (XOR) gates such as XOR gates 10 and 19 will sometimes be referred to herein as data input XOR gates, the XOR gates such as XOR gates 15 and 24 will sometimes be referred to herein as data output XOR gates, and XOR gates such as XOR gates 17 and 25 will sometimes be referred to herein as fault detecting XOR gates.

Generally speaking, but without discussing at this time the detailed operation thereof, the transmitter interface of data channel 20 will cooperate with the logic within block 35 to invert the transmitted signal to the stuck level polarity of bus line 47 when such transmitted signal would ordinarily be of the other level. The receiver interface portion of data channel 20 in cooperation with the logic in dotted block 35 will reinvert such inverted signal back to its original polarity level. Thus, the two inversions of the transmitted signal will result in a signal of the originally transmitted level being presented to receiver 18. More specifically, if the signal to be transmitted for example, is a low level signal and a high level stuck condition exists on bus line 47 then the transmitter interface in cooperation with block 35 logic will detect such problem and invert the transmitted signal to a high level which will permit it to appear on the data line. Obviously, a low level signal could not appear on bus line 47 since the bus line 47 is stuck on a high level polarity. The high level signal actually appearing on bus line 47 is reinverted back to its low level in the receiver interface portion of data channel 20 so that the receiver receives the originally transmitted low level signal.

It should be noted that for circuit simplicity and low cost the logic elements shown in the single dotted block 35 are made to function identically and simultaneously for all of the eight data channels. Thus, while the double inversion, as described above, is being applied to the logic levels of the channel with the stuck line, similar double inversion is also being applied to the logic levels of the other seven data channels. These inversions, although not necessary, do not impair the correct transmission of data over these channels.

The logic within the dotted block 35 includes an OR gate 57, a low pass filter 55, and an AND gate 61. A "correction enable" signal is supplied input 56 of AND gate 61 from clock pulse source 12 to disable AND gate 61 for a period extending from just before each change of data bits to just after each data bit change for reasons to be discussed later herein. At all other times AND gate 61 is primed.

It should be noted that the various resistors identified by the notation "R," and employed throughout the logic diagrams of FIGS. 1, 4, 5, 6 and 7, are isolating or protective resistors and function to prevent certain types of failures from being supplied back to bus 47 and appearing as stuck conditions.

More specifically, consider as an example the function of the R resistor 160 of FIG. 1. In the absence of such resistor 160, a failure of XOR gate 17 might produce a stuck condition on bus line 47. However, with resistor 160 present in the circuit, a failure of XOR gate 17 can produce only a relatively slight change in the potential of bus 47. Such change will not qualify as a stuck condition and the circuit will continue to operate normally in a satisfactory manner.

It will be noted that the system shown in FIG. 1 is unidirectional in that data is transmitted only from a transmitter 16 to a receiver 18 and not from receiver 18 back to the transmitter 16 as opposed to the logic of FIG. 4 wherein information can be transmitted bi-directionally as will be discussed later.

Figure 2:
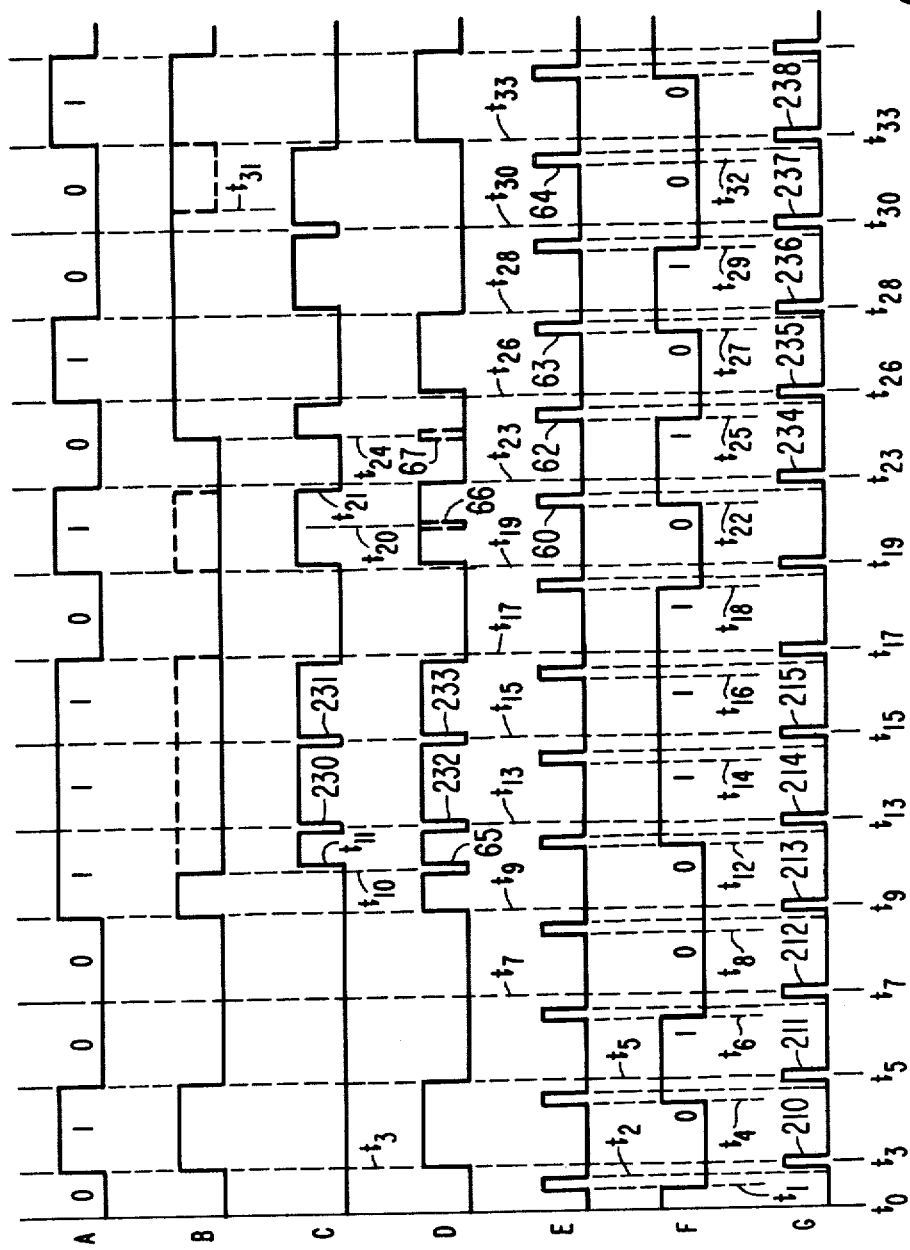
FIG. 2 is a set of waveforms to facilitate an understanding of FIG. 1.

In the circuit of FIG. 1 the transmitter 16 generates a two-level signal sequence which can be a sequence of binary bits as shown in waveform A of FIG. 2, for example. The high and low levels of the data signals are also referred to herein as binary 1's or 0's or simply as 1's or 0's. Separate ones of such two-levels signals are supplied to one input 44 of data input XOR gate 10 and one input of data input XOR gate 19 and also to corresponding inputs of the data input XOR gates of the six other data lines 39, not actually shown in FIG. 1.

In the absence of a stuck failure, a binary 0 is supplied via lead 48 to the second inputs of all the data input XOR gates—data input XOR gates 10 and 19, for example. The reason why a binary 0 is supplied to the second inputs of such XOR gates in the absence of the stuck failure will be discussed later herein in connection with the logic within dotted block 35.

As is well known, it is a characteristic of an XOR gate that when the signal logic levels supplied to the two input terminals thereof are equal, whether binary 0's or binary 1's (low and high levels) the output is a 0, and if the signal logic levels supplied to the two input terminals thereof are unequal then the output is a 1. Thus, when a 0 is supplied to input terminal 46 of XOR gate 10, then the output of XOR gate 10 will always be the same as the signal level supplied to the first input terminal 44 thereof. More specifically, if a 1 is supplied to input terminal 44 then the logic levels supplied to the two input terminals 46 and 44 are unequal and the output is a binary 1.

Similarly, if a binary 0 is supplied to input terminal 44 of XOR gate 10 the output of such XOR gate 10 will be a binary 0 since the logic levels supplied to the two inputs thereof are the same, both being binary 0's.

In summary, if a binary 0 is supplied to input terminal 46 of XOR gate 10 the binary signal logic level supplied to input terminal 44, whether a 1 or a 0, passes through amplifier 11 without change of logic level and then through bus line 47 to the amplifier 14. The amplifier 14 in turn passes the signal supplied thereto without change in logic level to a first input terminal 51 of XOR gate 15. In the absence of the stuck condition a binary 0 is also always supplied to a second input terminal 50 of XOR gate 15 via lead 36 so that the output of XOR gate 15 will pass whatever logic level is supplied to its input terminal 51 in the same manner as discussed re XOR gate 10.

Thus, in the absence of a stuck condition the binary signal level supplied by transmitter 16 to the input terminal 44 of XOR gate 10 at the transmitter interface passes through the data channel 20 to the receiver 18 without change in logic level.

However, if a low level stuck condition exists on bus line 47 due to some fault in the circuit, such as the amplifier 11 being faulty, the bus line 47 will be at a low level at all times regardless of the level of the amplifier 11 input. In such an event it is obviously impossible to pass high level signal from the transmitter 16 to the receiver 18 through the short circuited bus line 47 in the absence of some type of corrective circuit means. More specifically, if bus 47 is shorted to ground (the low level signal) then the output of XOR gate 15 supplied to receiver 18 will also be a low level signal although the transmitted signal from transmitter 16 is a high level signal. This discrepancy between transmitted and received signals constitutes an undesirable data error.

Logic means to detect and compensate for the low level stuck condition of bus line 47 includes XOR gates 17 and 15 and the logic within the dotted block 35, which will now be discussed.

Consider further the case where bus line 47 becomes stuck at its low level and a high level signal is supplied to input terminal 44 of Exclusive OR gate 10. The logic levels supplied to the two input terminals 58 and 59 of XOR gate 17 will be opposite so that the output signal therefrom will be a binary 1, i.e., a high level signal. Such high level signal passes through OR gate 57, low pass filter 55, and primed AND gate 61 to the second input terminals 46 and 50 of XOR gates 10 and 15 via leads 48 and 36, respectively. The XOR gates such as XOR gates 17 and 25 will sometimes be referred to herein as fault detecting XOR gates.

Thus, the output of XOR gate 10 will become a low level signal since both inputs thereof have a high level signal supplied thereto.

An associated problem resulting from a low level stuck condition of line 47 caused by a short-circuit to ground, is that amplifier 11, in attempting to drive line 47 to a high level, will draw excessive current from its power supply. This current, and resultant power dissipation, if allowed to continue long enough, may result in damage to amplifier 11 or to other components. Inverting the binary 1 input signal to input terminal 46 of XOR gate 10 to a binary 0 avoids such excessive current.

The stuck low level signal on bus line 47 is supplied through amplifier 14 to input terminal 51 of XOR 15. Since the logic levels to the two input terminals of XOR gate 15 are opposite the output signal therefrom will be a binary 1, the logic level of the originally transmitted signal, e.g. the correct data.

It should be noted that the binary 1 supplied from AND gate 61 back to the inputs of XOR gates 10 and 15 to cause the inverting function is also supplied to the corresponding inputs of the data input and data output XOR gates of the seven other data channels to cause inverting functions thereon. Thus, for example, the data supplied to input 37 of XOR gate 19 of data channel 22 will be inverted thereby so that the inputs to XOR gate 25 will be unequal. Accordingly, XOR gate 25 will output a high level signal to OR gate 57 which, in the absence of any provision to the contrary, will indefinitely maintain a binary 1 on leads 48 and 36. Thus, when a low level signal is next supplied from decoder 13 to input 44 of XOR gate 10 it will be inverted to a 1 by data output XOR gate 15, even though it should remain a binary 0, because of the stuck condition of bus line 47 to a low logic level.

Accordingly, some means is required to provide low level "correction enable" signals on output leads 48 and 36 of AND gate 61 during each data bit change in order to permit the XOR gates, such as XOR gate 25 of data channel 22, to return to 0 when there is no stuck condition thereon. Such correction enable signal is supplied from timing means 12 via lead 56, and functions to inhibit AND gate 61 during every data bit change. If the stuck condition remains on bus line 47 of data channel 20 at the termination of the correction enable signal, the output of XOR gate 17 will again become a high level signal and will again supply a high level signal through OR gate 57 through primed AND gate 61 to all of the data input and data output XOR gates of all of the data channels. The foregoing will be discussed in more detail later in connection with the waveforms of FIG. 2.

A low level data signal supplied to input 44 of XOR gate 10 will pass through said XOR gate 10 and amplifier 11 as a low level signal and then be supplied to bus line 47. Although bus line 47 is stuck at a low logic level, this condition will be "invisible," in that amplifier 14 will receive a correct low logic level signal from line 47, exactly as though the stuck failure of line 47 did not exist. Amplifier 14 will then pass a low level signal through XOR gate 15 to receiver 18.

It should be noted that in the case of an "invisible" stuck failure, such as described above, the two inputs 58 and 59 of XOR gate 17 are at the same logic level. Therefore, XOR gate 17 outputs a low logic level to dotted block 35 and a low logic level is subsequently supplied via line 48 to input 46 of gate 10 and via line 36 to input 50 of gate 15. Thus gates 10 and 15 are made non-inverting for the logic levels applied to the other inputs 44 and 51 of XOR gates 10 and 15.

Similarly, if bus 47 is stuck at a high level, a high level signal supplied to input 44 of XOR gate 10 will pass completely through data channel 20 to the output of XOR gate 15 as a high level signal, the high level stuck condition of bus line 47 being invisible to the system.

However, if a low level data signal is supplied to input 44 of XOR gate 10 when bus line 47 is stuck at a high level, then the double inversion of the signal will occur. More specifically, the logic levels supplied to the two inputs 58 and 59 of XOR gate 17 will be opposite so that a 1 will be supplied from XOR gate 17 through OR gate 57, AND gate 61, and then back to the inputs 46 and 50 of XOR gates 10 and 15. The foregoing will result in both XOR gates 10 and 15 inverting the logic levels supplied to the other inputs thereof in the manner described above.

The structure of FIG. 1 will now be discussed in detail with the aid of waveforms of FIG. 2. The waveforms of FIG. 2 will be referred to herein as waveform 2A, waveform 2B, etc., with the notations 2A, 2B, 2C, 2D, 2E, 2F and 2G appearing on the logic drawing of FIG. 1 at the points where such waveforms in fact will appear as signals.

Consider first the normal operation of the circuit of FIG. 1 when no stuck condition is present. Such normal operation exists between the times $t_0$ and $t_{11}$ of FIG. 2 and then between the times $t_{20}$ and $t_{24}$. The time periods between $t_{11}$ and $t_{20}$ and between $t_{24}$ and $t_{31}$ represent the operation of the circuit when a stuck condition exists.

The waveform 2A represents a two-level signal generated by the transmitter 16 (FIG. 1) which comprises the encoder 13 under control of clock pulse source 12. It is to be understood that waveform 2A is the signal appearing on only one output terminal of encoder 13 of the eight output lines, including output line 42 which leads to data channel 22 and six additional output lines 38 which lead to the six other data channels 39 not specifically shown in FIG. 1.

As stated above, during normal operation of the circuit when no stuck condition exists, a binary 0 is supplied to the lower input terminal 46 of XOR gate 10 of data channel 20 as well as to corresponding inputs of the data input XOR gates of the seven other data channels.

Assume that a data binary 0 is being supplied to input terminal 44 of XOR gate 10 at time $t_0$ as shown in waveform 2A. Because the signal levels supplied to input terminals 44 and 46 of XOR gate 10 are both binary 0's a low level signal will be supplied from XOR gate 10 through amplifier 11 and bus line 47 to amplifier 14. The output of amplifier 14 will also be a binary 0 which is supplied to one terminal of Exclusive OR gate 15. Since the other input terminal 50 of XOR gate 15 is also a binary 0 in the absence of a stuck condition the output of XOR gate 15 will also be a binary 0 which is supplied to the input of sampling and waveform generation logic 45 of receiver 18 and also to a clock pulse source 69. The output signal from XOR gate 15 between time $t_0$ and time $t_{11}$ is shown in waveform 2D and can be seen to be quite similar to waveform 2A.

It is necessary to sample and reproduce the received waveform 2D due to distortion introduced therein during its transmission. Such regeneration is generally done by sampling the received waveform near the end of each bit period by sampling pulses such as those shown in waveform 2E which can be seen to occur at the end of each bit period of waveform 2D. The sampling pulses of waveform 2E are generated by clock pulse source 69 in response to one of the channels of information transmitted, such as the channel implemented by data line 20. The clock pulse source 69 can respond to the leading edge, for example, of the received signal and generate the proper sampling pulses of waveform 2E therefrom. Such sampling pulses are supplied via lead 54 to sampling and waveform regeneration logic 45 which responds to such sampling pulses and also to the signal of waveform 2D to produce the regenerated signal shown in waveform 2F. Waveform 2F can be seen to be identical to waveform 2A except that it is shifted therefrom by the time period $t_4-t_3$.

When a binary 1 is supplied from encoder 13 to XOR gate 10 at time $t_3$ the output of XOR gate 10 will be a 1 as will the output of amplifier 11. Such high level (binary 1) signal is supplied via bus 47 to amplifier 14 whose output is also a 1 which is supplied to XOR gate 15. Since the signal supplied to the other input terminal of XOR gate 15 is a 0 the output of XOR gate 15 will be a 1 which is supplied to sampling and waveform generation logic 53 and also to clock pulse source 69.

During time period $t_0-t_{11}$, the signal level on the output lead 36 of AND gate 61 remains a low level signal, as shown in waveform 2C. The output of AND gate 61 during time period $t_0-t_{11}$ is a low level signal because the output signals of all the fault detecting XOR gates corresponding to XOR gates 17 and 25 are low level signals during such time period $t_0-t_{11}$. More specifically, at time $t_0$ a low level signal is supplied to a first input 59 of XOR gate 17 via lead 43 which connects the output lead 49 of encoder 13 directly to said first input of XOR gate 17. Since there is no stuck condition at time $t_0$ the output of the amplifier 11 will also be a 0 which is supplied directly to the other input terminal 58 of XOR gate 17. Thus, since the levels of the signals supplied to the two inputs 59 and 58 of XOR gate 17 are the same, the output of said XOR gate 17 will be a 0 which is supplied to one input of OR gate 57.

Similarly, when a 1 is present on the output of terminal 49 of encoder 13, as shown at time $t_3$ in waveform 2A, the outputs of both XOR gate 10 and amplifier 11 are high level signals. Thus, the two signals supplied to the two inputs of XOR gate 17 are both high level signals (binary 1's) so that the output thereof is a low level signal.

Accordingly, it can be that in the absence of a stuck condition, whether the inputs to the eight data lines are 1's or 0's the outputs of the fault detecting XOR gates such as XOR gates 17 and 25 will all be 0's. Thus the output of OR gate 57 will also always be a 0 when the circuit is in a non-stuck condition.

Assume now that at time $t_{11}$ a low level stuck condition suddenly occurs on bus 47, as shown in waveform 2B, at a time when a 1 is being transmitted therethrough. Under such stuck condition the input terminal 59 of Exclusive OR gate 17 will remain a 1 since it is connected directly to the output 49 of encoder 13. However, the other input terminal 58 of XOR gate 17 will now be 0 due the short circuit stuck condition. Thus the output of XOR gate 17 will be a 1 which will then pass through OR gate 57, low pass filter 55 and AND gate 61 to produce high level signals on the output leads 36 and 48 thereof as shown in waveform 2C at time $t_{11}$. Such high level signal is supplied to two destinations. One destination is to the input terminal 46 of XOR gate 10 via lead 48 and the other is to the input terminal 50 of the XOR gate 15 via lead 36. Since the signals supplied to the two inputs of XOR gate 10 are now both 1's the output of XOR gate 10 will become a 0 which is passed through amplifiers 11 and 14 to the input terminal 51 of XOR gate 15. The pulse 65 of waveform 2D is a short transient pulse existing during the time required to supply the output of OR gate 57 back to the inputs of XOR gates 10 and 15. Such transient pulse 65 and similar transient pulse 66 can be removed from the signal 2D by low pass filter 55.

Since the data signal passing through bus 47 is a low level signal as is the level that said bus has been forced to assume because of the short circuit stuck condition, the stuck condition is invisible to the system.

During time period $t_0-t_{10}$, four correction enable pulses 210 through 213 occur, as shown in waveform 2G. Each of these correction enable pulses 210-213 occurs during a time period beginning just prior to a data change and terminating immediately after the data change. For example, the correction enable pulse 210 begins just prior to time $t_3$ when a data change occurs, as shown in waveform 2A, and terminates immediately after time $t_3$. Thus during the data change at time $t_3$ and AND gate 61 of FIG. 1 is disabled so that the output thereof is a 0. However, the output of OR gate 57 would have been a 0 even in the absence of correction enabling pulses during the time period $t_0-t_{10}$ since no stuck condition exists during such time period. Thus the four correction enabling pulses 210-213 have no real effect on the circuit in the absence of a stuck condition.

However during the period $t_{10}-t_{20}$, when a low level stuck condition exists on bus line 47, the correction enable signals of waveform 2G will have an effect on the circuit when a high level signal is supplied to the input terminal 44 of Exclusive OR gate 10. For example, correction enabling pulses 214 and 215 occurring at times $t_{13}$ and $t_{15}$ as shown in waveform 2G occur when a binary 1 is being supplied to input 44 of Exclusive OR gate 10 as shown in waveform 2A.

The two correction enable pulses 214 and 215 disable AND gate 61 during the period that the data bit change occurs at times $t_{13}$ and $t_{15}$ so that the outputs of the XOR gates of the seven other bus lines corresponding to XOR gates 17 of data line 20 will return to a low level condition as discussed hereinbefore.

The driving of the output of AND gate 61 to 0 by the correction enable pulses 214 and 215 of waveform 2G is reflected by the negative excursions 230 and 231 in waveform 2C and also negative excursions 232 and 233 in waveform 2D which is the output of Exclusive OR gate 15. The outputs of XOR gates 10 and 15 will experience the negative excursions 230–233 during the two enable correction pulses 214 and 215 since low level signals will be supplied to both inputs thereof.

Although not specifically shown as an example in FIG. 2 it will be apparent that a change from one binary 0 to another binary 0 bit will render the occurrence of the corresponding correction enable pulse moot since the output of XOR gate 17 will already be a binary 0 during such data bit change.

Similarly, as will be discussed later herein, when the bus line 47 is stuck in a high level state correction enable signals are in fact required only when the signal level supplied to input 44 of XOR gate 10 is a low level signal.

Because of the low level stuck condition at time $t_{11}$, a high level signal from OR gate 57 exists on input terminal 50 of XOR gate 15. Therefore, since the levels of the two signals supplied to the two inputs 50 and 51 of XOR gate 15 are unequal the output of the XOR gate 15 is a 1 as shown in waveform 2D at time $t_{11}$, which is the signal level originally transmitted from encoder 13.

In summary, the high level signal supplied from encoder 13 on lead 49 was first inverted by XOR gate 10 to a low level signal during transmission through bus 47 so that the stuck condition was in fact invisible to the system and then reinverted back to a high level by XOR gate 15.

Assume not that at time $t_{20}$ the low level stuck condition disappears so that data channel 20 resumes normal operation. In the example shown in the waveforms of FIG. 2 the return to normalcy of the system at time $t_{20}$ occurs when encoder 13 is supplying a binary 1 to input 44 of XOR gate 10. At the return to normal operation the output of XOR gate 17 will not return to a low level since a 1 will continue to be supplied to input terminal 46 of XOR gate 10, thereby causing XOR gate 10 to invert the 1 being supplied to input lead 44 thereof. The 1 supplied to input lead 46 of XOR gate 10 is a result of the pre-existing 1 being supplied from AND gate 61 to the input of the XOR gates of the other seven channels corresponding to XOR gate 10 of channel 20. Such a binary 1 will continue to be outputted from AND gate 61 until the occurrence of the next correction enable pulse 234 at time $t_{23}$. Such correction enable pulse 234 will momentarily inhibit AND gate 61 to supply 0's to the inputs of XOR gates, such as XOR gate 10, thereby causing the outputs of all of the fault detecting XOR gates, such as XOR gate 17, to output 0's since a stuck condition no longer exists on any of the eight data channels. It should be noted that prior to time $t_{23}$ sampling pulse 60 of waveform 2E occurs at time $t_{22}$. However, the correct signal will in fact appear at the output of the XOR gates, such as Exclusive OR gate 15, located at the receiver, since all channels will be double inverting the received data signal.

Assume that normal operation continues from time $t_{20}$ through to time $t_{24}$ when a high level stuck condition occurs as indicated in waveform 2B. At time $t_{24}$ the signal being supplied to input 44 of XOR gate 10 is a 0 so that the signal supplied to the two inputs 58 and 59 of XOR gate 17 are unequal. Thus, the output of XOR gate 17 is a 1 which passes through OR gate 57, low pass filter 55, AND gate 61, and leads 48 and 36 to the inputs 46 and 50 of XOR gates 10 and 15.

The output of XOR gate 10 is now a 1 since the signals supplied to the two inputs thereof are unequal. Such binary 1 passes through amplifier 11 and through bus 47, which is stuck at a binary 1 level, and then through amplifier 14 to input 51 of OR gate 15. Again it is to be noted that since the bus 47 is stuck at the high level the transmission of the high level signal through bus 47 appears to be what in fact it is, namely a high level signal. The stuck condition is invisible to the data line during the transmission of a binary 1. Since the signal supplied to the two inputs 50 and 51 of OR gate 15 are both binary 1's, the XOR gate 15 will supply a binary 0 to receiver 18 where it is processed in the manner described hereinbefore. More specifically, the waveform 2D is sampled at time $t_{25}$ by sampling pulse 62 of waveform 2E to produce the low level regenerated signal at time $t_{25}$, as shown in waveform 2F.

Just prior to time $t_{26}$, when a data transition occurs, correction enable pulse 235 of waveform 2G occurs and extends over the data change as discussed above. Thus the 1's generated at the outputs of the data input XOR gates of the seven other channels will be caused to output 0's in the manner discussed hereinbefore so that at the expiration of enable correction pulse 235 all of the error detecting XOR gates will be outputting 0's. XOR gate 17 will output a 0 even though the bus line 47 is stuck at a high level since a binary 1 is at that time being supplied to the input 44 of XOR gate 10.

Thus after the correction enable pulse 235 of waveform 2G the system will be operating as if no stuck condition exists since said stuck condition is invisible to the system during such pulses. The output of XOR gate 15 will also be a 1 as shown at time $t_{26}$ in waveform 2D. Such waveform is sampled by sampling pulse 63 at time $t_{27}$ to supply a binary 1 to receiver 18 at time $t_{27}$ in the manner described hereinbefore.

At time $t_{28}$, and after correction enable pulse 236, encoder 13 will be supplying a binary 0 to input 44 of XOR gate 10 to cause XOR gate 10 to output a binary 1 since the levels of the signals supplied to the two inputs of XOR gate 17 are unequal. Such binary 1 will be supplied through OR gate 57, low pass filter 55, AND gate 61 and then back to second inputs 48 and 50 of XOR gates 10 and 15 which will respond thereto to output binary 1's which, as discussed above, are invisible to the system since bus 47 is stuck at a high level.

Assume now that at time $t_{31}$ the high level stuck condition terminates, as shown in waveform 2B. However, the output of XOR gate 10 will remain at a high level since a 1 is being supplied to the input lead 46 thereof, such 1 originating from the fault detecting XOR gates of the seven other channels as discussed above. It is not until the occurrence of correction enable pulse 238 that the outputs of the fault detecting XOR gates of all eight channels are changed to a binary 0 so that the system will then continue to run in a normal, unstuck mode of operation.

Figure 3:
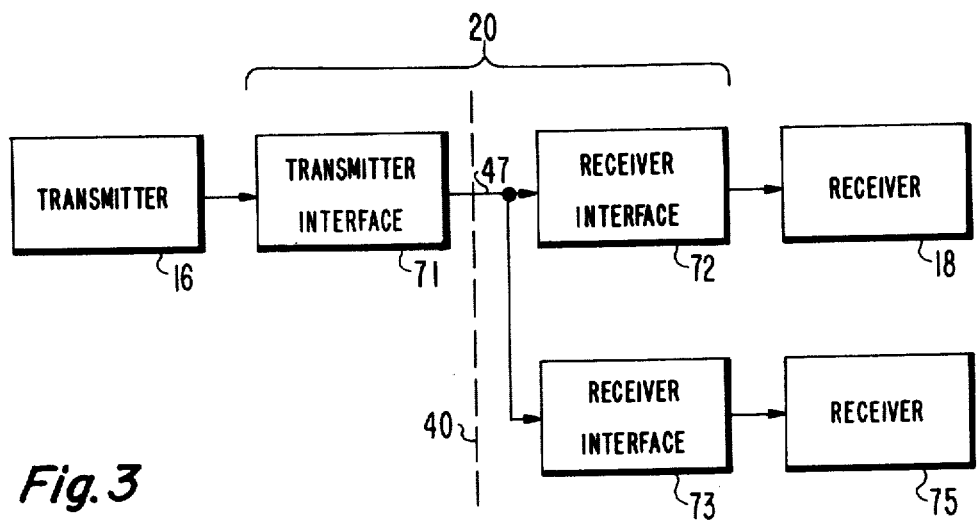
FIG. 3 is a block diagram showing the broad architecture of the structure of FIG. 1.

In FIG. 3 there is shown a very generalized block diagram of a system similar to that shown in FIG. 1 but with two receivers. In FIG. 3 transmitter 16 and receiver 18 correspond to transmitter 16 and receiver 18 of FIG. 1. The transmitter interface 71 and the receiver interface 72 collectively correspond to the eight data channels (such as data channel 20) of FIG. 1. An additional receiver interface 73 and a receiver 75, receive their input from the common bus line of each of the eight data channels (such as bus line 47 of channel 20). Further receiver interfaces and receivers can be added to the system in parallel fashion. It can be seen that if a stuck condition occurs on the common bus line 47, all of the receivers will receive incorrect data in the absence of the corrective action of the present invention. However, with such correction action all receivers will receive correct data.

Figure 4:
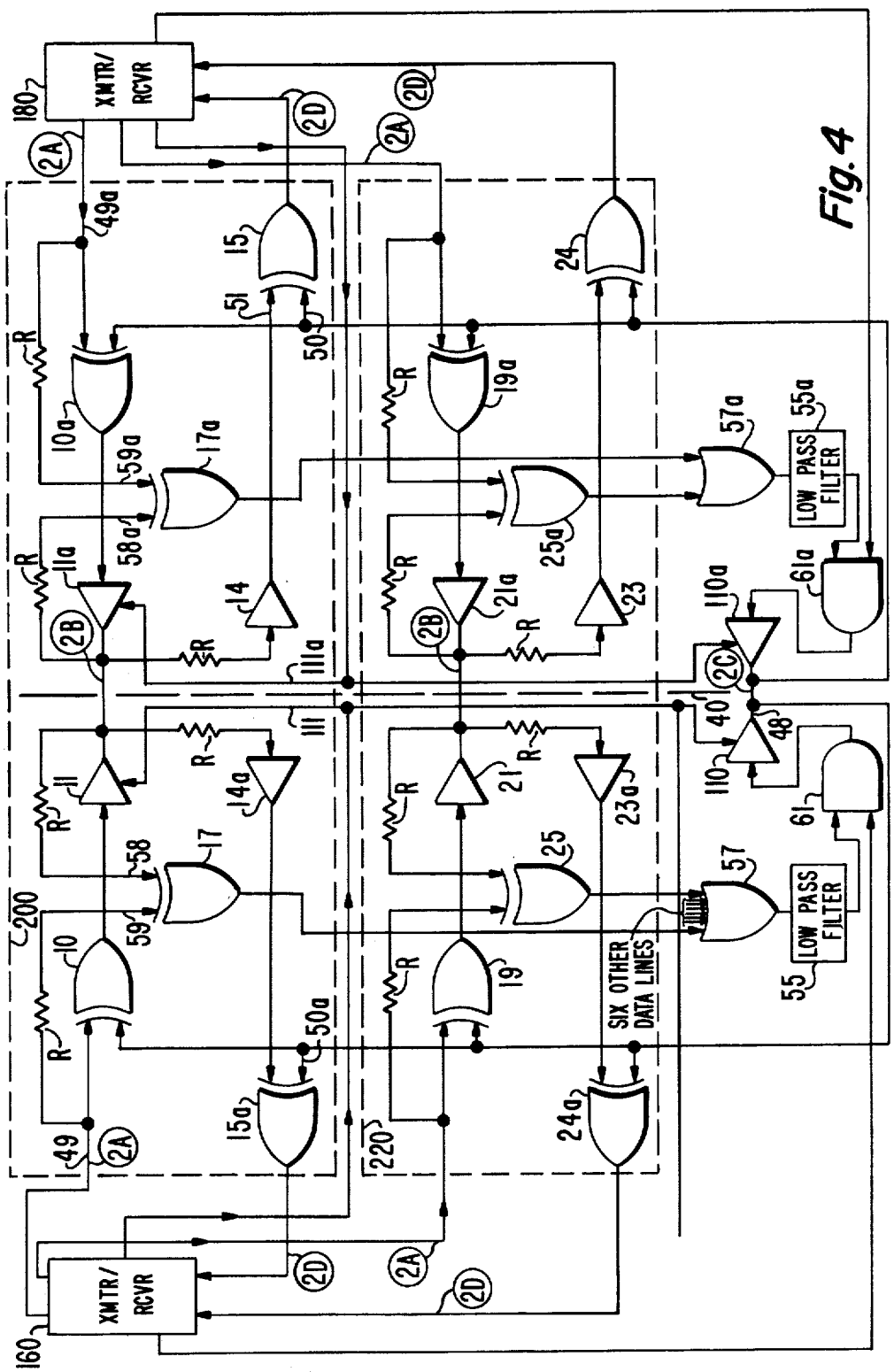
FIG. 4 is a combined block and logic diagram of another form of the invention.

Referring now to FIG. 4 there is shown logic for a bi-directional form of the invention as opposed to the unidirectional form of the invention shown in FIG. 1.

The logic of FIG. 4 differs from that of FIG. 1 in that both a unilateral transmitter interface and a unilateral receiver interface of FIG. 1 are employed at each end of the data channel of the structure shown in FIG. 4. Thus each site can function either as a transmitter or a receiver with means provided such that only one site will be active as a transmitter or a receiver at any given time. For example, consider data channel 200 of FIG. 4, which corresponds generally to data channel 20 of FIG. 1. In FIG. 4, certain elements correspond exactly to elements of FIG. 1 and are defined by the same reference character. Specifically, in FIG. 4 XOR gate 10, amplifier 11, bus line 47, amplifier 14 and XOR gate 15 correspond to logic elements shown in FIG. 1 and bear the same reference characters and, in fact, function in the same manner. The waveforms of FIG. 2 are applicable to FIG. 4 and the points of FIG. 4 at which the signals represented by the waveforms appear are identified by the same notation as identify the waveforms, such as 2A, 2B ... 2D in the same manner as employed in FIG. 1. In FIG. 4 transmitter/receivers 160 and 180, referred to herein as transceivers, replace the transmitter 16 and receiver 18 of FIG. 1 to accommodate bi-directional transmission of data. The logic elements mentioned above, beginning with XOR gate 10, transmit data from transceiver 160 to transceiver 180 with transceiver 160 acting as a transmitter and transceiver 180 acting as a receiver.

A second transmission logic means, which is the same as the one described above, extends from transceiver 180 to transceiver 160 and comprises XOR gate 10a, amplifier 11a, amplifier 14a, XOR gate 15a and fault detecting XOR gate 17a.

The waveforms of FIG. 2 are also applicable to this second transmission path and the points in such second transmission path at which the signals represented by such waveforms appear are identified by circled legends such as 2A, 2B, etc. in the same manner as employed in FIG. 1.

Since transceiver 160 and transceiver 180 must operate as complementary functions at any given time, i.e, one as a transmitter and the other as a receiver, means are provided either in the programming or in the hardware which inform the system as to which transceiver is acting as the transmitter and which is acting as the receiver at any given time. Such status information is supplied via leads 111 and 111A to disable the transmitting elements at the interface(s) of the transmitter(s) acting as receiver(s) and enable the transmitting elements at the interface of the one transceiver acting as a transmitter. More specifically, assuming transceiver 160 is acting as a transmitter and transceiver 180 is acting as a receiver, a binary 1 is supplied from transceiver 160 to lead 111 which will enable tri-state devices 11, 21 and 110. Simultaneously, a signal from transceiver 180 on lead 111A will disable tri-state devices 11A, 21a and 110a so that the transceiver 180 will act as a receiver.

It should be noted that disabling of tri-state devices such as 11a, 21a, and 110a causes such devices to appear as very large impedances, i.e., virtually as open circuits. On the other hand, when such tri-state devices are enabled the signal supplied to their inputs, i.e., a high or low level signal, will appear as a high or low level signal at the output thereof. Thus with tri-state device 110a disabled and tri-state device 110 enabled, the output of OR gate 57, through low pass filter 55 and AND gate 61 will appear on output lead 48 of tri-state device 110, which also functions as an amplifier.

OR gate 57, low pass filter 55, and AND gate 61 correspond to OR gate 57, low pass filter 55 and AND gate 61 of FIG. 1. OR gate 57A, low pass filter 55A, AND gate 61a, tri-state device 110a perform the same functions when transceiver 180 is the transmitter as do OR gate 57, low pass filter 55, AND gate 61, and tri-state device 110 when transceiver 160 is the transmitter.

In data channel 220 of FIG. 4, the logic elements corresponding to the logic elements of data channel 22 of FIG. 1 and are identified by the same reference character. Thus XOR gates 19, 25, 24 and amplifiers 21 and 23 correspond to similar logic elements identified by the same reference characters in FIG. 1 and constitute a data transmission path from transceiver 160 to transceiver 180. The logic elements in data channel 220, identified by reference characters followed by the letter "a," correspond to the logic elements in data channel 220 having the same reference characters not followed by the reference letter "a" and form a transmission path from transceiver 180 to transceiver 160 in the manner described in connection with FIG. 1.

As in the case of data channel 200 of FIG. 4, points in data channel 220 of FIG. 4 at which the signals represented by the waveforms of FIG. 2 appear are identified by encircled legends 2A, 2B, etc., in the manner employed in data channel 200 of FIG. 4.

In FIG. 4 the logic to the left of the vertical dotted line 40 is located at the site of transceiver 160 and the logic to the right of dotted line 40 is located at the site of transceiver 180.

Figure 5:
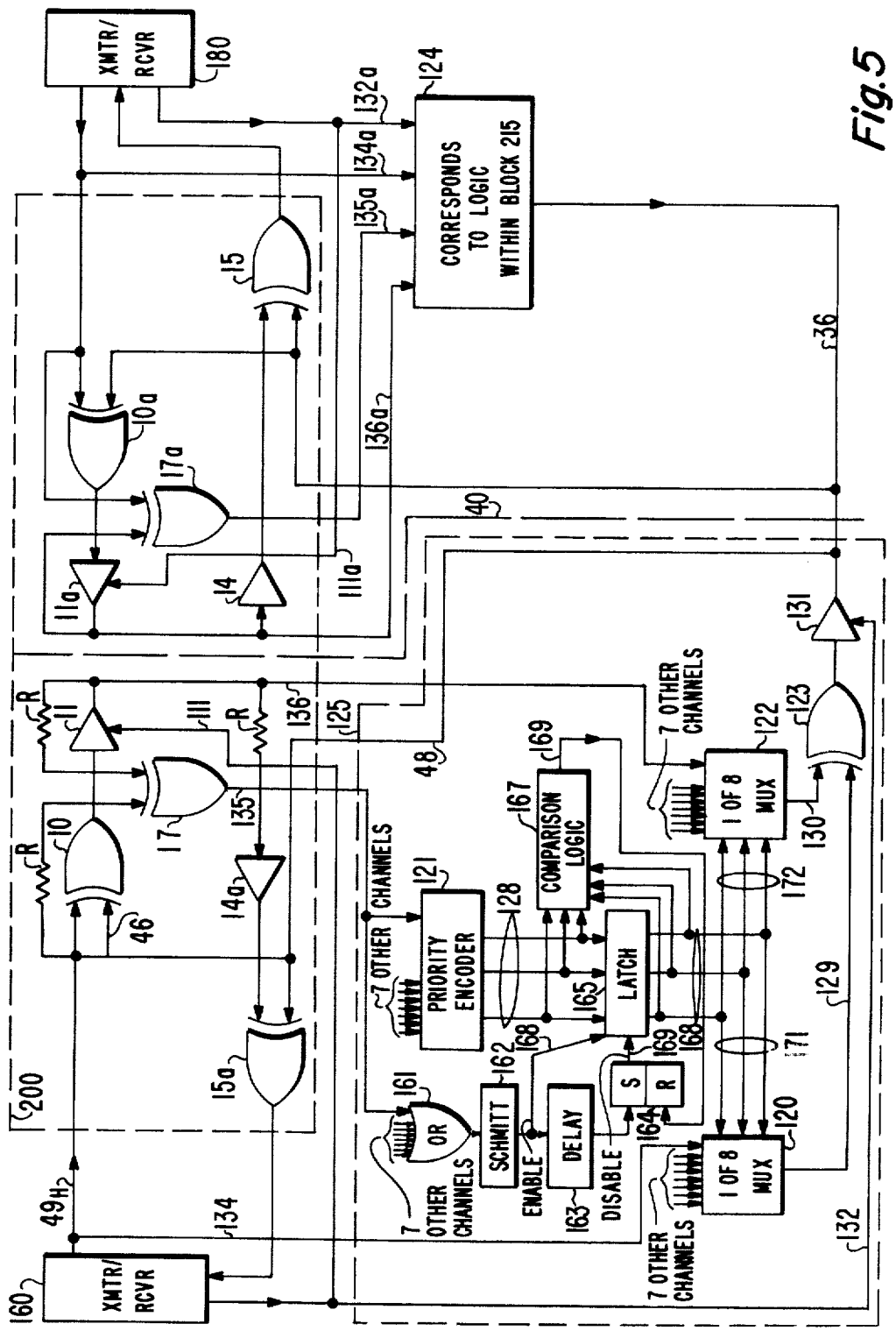
FIG. 5 is another combined block and logic diagram of yet another form of the invention.

Referring now to FIG. 5 there is shown another form of the bi-directional mode of the embodiment of the invention similar to that shown in FIG. 4 and with corresponding elements identified by the same reference characters as used in FIG. 4. In FIG. 5 data channel 220 has been omitted and only data channel 200 shown. Also in FIG. 5 the logic within the dotted block 125 replaces OR gate 57, low pass filter 55, AND gate 61, and tri-state device 110 of FIG. 4 and performs a similar but somewhat different function as described below. It is to be understood that the logic within the data channel 200 of FIG. 5 performs in the identical manner as does the logic within the dotted block 200 of FIG. 4 and that the waveforms of FIG. 2 apply to the logic within the dotted block 200 of FIG. 5 in the same manner as discussed in connection with the logic within the dotted block 200 of FIG. 4.

The reason for employing the logic within the dotted block 125 of FIG. 5 rather than OR gate 157, low pass filter 55, AND gate 61 and tri-state device 110 of FIG. 4 is as follows. The implementations shown in FIGS. 1 and 4 are capable of fully compensating for a stuck failure on only one bus line at a time. Although the likelihood of simultaneous stuck failures on multiple bus lines is small, it is nevertheless desirable to minimize the consequences of data inaccuracy which might result therefrom. In certain applications, such as processing analog values from pressure gauges, thermostats, etc., the individual bits of the data words representing such analog values have different weights. For example, the most significant bit in an eight bit word would have a value proportional to $2^7$ whereas the least significant bit would have a value proportional to $2^0$, assuming linear relationship. Thus a stuck condition in the least significant bit would have very little effect on the total value of the analog signal in most applications. However, a failure in the most significant bit would make a great deal of difference in the value of the analog signal. Thus, in such applications, and in the event of multiple stuck failures, it is preferable to ignore failures in less significant bit positions and correct for a stuck condition in the most significant bit position with such a failure rather than cease operation of the system. Thus, if two failures occur in the data lines, one in the second most significant bit position and one in the fourth most significant bit position, the system might operate acceptably by correcting only for the stuck condition existing on the data line carrying the second most significant bit position data and ignoring the error introduced by the stuck condition on the data line carrying the fourth most significant bit position data.

The priority encoder 121 of FIG. 5 functions to identify the highest order bit position data line having a stuck condition. It will be noted that the inputs to priority encoder 121 are the outputs of the fault detecting XOR gates such as XOR gate 17. The output of the priority encoder 121, a device well known in the art, consists of three leads 128 which identify the highest order bit position data line on which a stuck condition has occurred and supplies such identification to latch 165 which, in turn, supplies such identification to the one-out-of-eight multiplexer (MUX) 120 and the one-out-of-eight MUX 122 under conditions to be described later herein.

The inputs to MUX 120 are the same as the eight inputs to the eight data input XOR gates such as XOR gate 10 and are, in fact, the signals supplied from transceiver 160. The signal level on the identified data line is supplied to one input terminal of XOR gate 123 via lead 129. The polarity of the stuck condition on the associated bus line 47 is supplied to the other input of XOR gate 123 by means of MUX 122. More specifically, the polarity of the eight bus lines of the system, such as bus line 47, are supplied to the eight input leads of MUX 122. The bus line of the particular data line identified by priority encoder 121 is connected by means of MUX 122 to the second input of XOR gate 123 via lead 130 so that the two inputs to the XOR gate 123 now consist of the original signal supplied from the transceiver 160 and the polarity of the stuck bus line 47. Thus, as discussed above in connection with FIGS. 1 and 4, if the level of the data input signal is the same as the level of the stuck condition then the signal supplied to the input 46 of XOR gate 10 will remain a 0. In this instance no correction is needed, or applied, since the stuck condition is invisible to the system. On the other hand, if the level of the data input signal is opposite that of the stuck condition of bus line 47 then the signal supplied to input terminal 46 of XOR gate 10 from tri-state device 131 will be a 1 and the input signals of all lines will be inverted. Further, the stuck condition will again be made invisible. The tri-state device 131 functions in the same manner as the tri-state device 110 of FIG. 4 in that it is enabled when the transceiver 160 is acting as a transmitter and is disabled when transceiver 160 is acting as a receiver. The block 124 represents logic which is the same as the logic within the dotted block 125 and is active when transceiver 180 is acting as a transmitter.

The priority encoding logic within the dotted block 125 of FIG. 5 functions as follows. When a stuck condition occurs to produce an output from one of the fault detecting XOR gates, such as XOR gate 17, such fault indicating signal will not only be supplied to priority encoder 121 but will also be supplied to OR gate 161 which will respond thereto to energize Schmitt trigger circuit 162. The pulse output from Schmitt trigger circuit 162 will be supplied through two paths to latch 165. The first path is through enable lead 168 which enables latch 165 to store the output appearing on output leads 128 of priority encoder 121. Further the output of Schmitt trigger circuit 162 is supplied through delay means 163 to set flip-flop 164 and thereby disable latch 165 from any further recording of an output from priority encoder 121 until flip-flop 164 is reset.

Latch 165 now contains the identification of the particular data channel in which the fault has occurred and, as discussed above, such channel identification is supplied to the input leads 171 and 172 of one-out-of-eight MUX's 120 and 122. As discussed above the outputs of MUX's 120 and 122 represent, respectively, the data signal and the bus voltage of channel 200 in which the fault is assumed to have occurred. Such two signals are supplied to XOR gate 123 and if they are unequal a 1 is supplied through tri-state device 131 back to the inputs of various XOR gates as discussed above.

The output of priority encoder 121 will occassionally change since the fault in channel 200 will periodically become invisible so that there will be no output from priority encoder 121. It is also possible that another fault should occur. If the new fault or stuck condition is in a channel which carries a bit of lesser significance than that carried by channel 200 then it is desirable that the system ignore such new fault. The foregoing is accomplished by comparison logic 167 which constantly compares the output of priority encoder 121 with that of latch 165. As long as the output of priority encoder 121 is less than that appearing on the output of latch 165 there will be no output from comparison logic 167.

However should a new fault occur in a channel carrying a more significant bit than that of channel 200 then the comparison logic 167 will supply a binary 1 to its output lead 169 to reset flip-flop 164 and thereby remove the disable signal from latch 165 to permit a signal to pass through OR gate 161, Schmitt trigger circuit 162 and through enable lead 168 to enable latch 165 which will respond thereto to store the new channel identification present in priority encoder 121.

As in the case of the structure of FIG. 4, the logic to the right of the vertical dotted line 40 is located at the site of transceiver 180 and the logic to the left of the vertical dotted line 40 is located at the site of transceiver 160. The four leads 132A, 134A, 135A, 136A to the right of dotted line 40 correspond to the leads 132, 134, 135, and 156 in the logic to the left of vertical line 40.

In some applications it might be desirable to latch onto a data line and a corresponding bus line of a channel at which a fault has occurred and to permanently correct for such failure in the interest of enabling high speed operation of the system. It is apparent that checking the system for fault each data bit will limit the speed of operation of the system to a degree.

Figure 6:
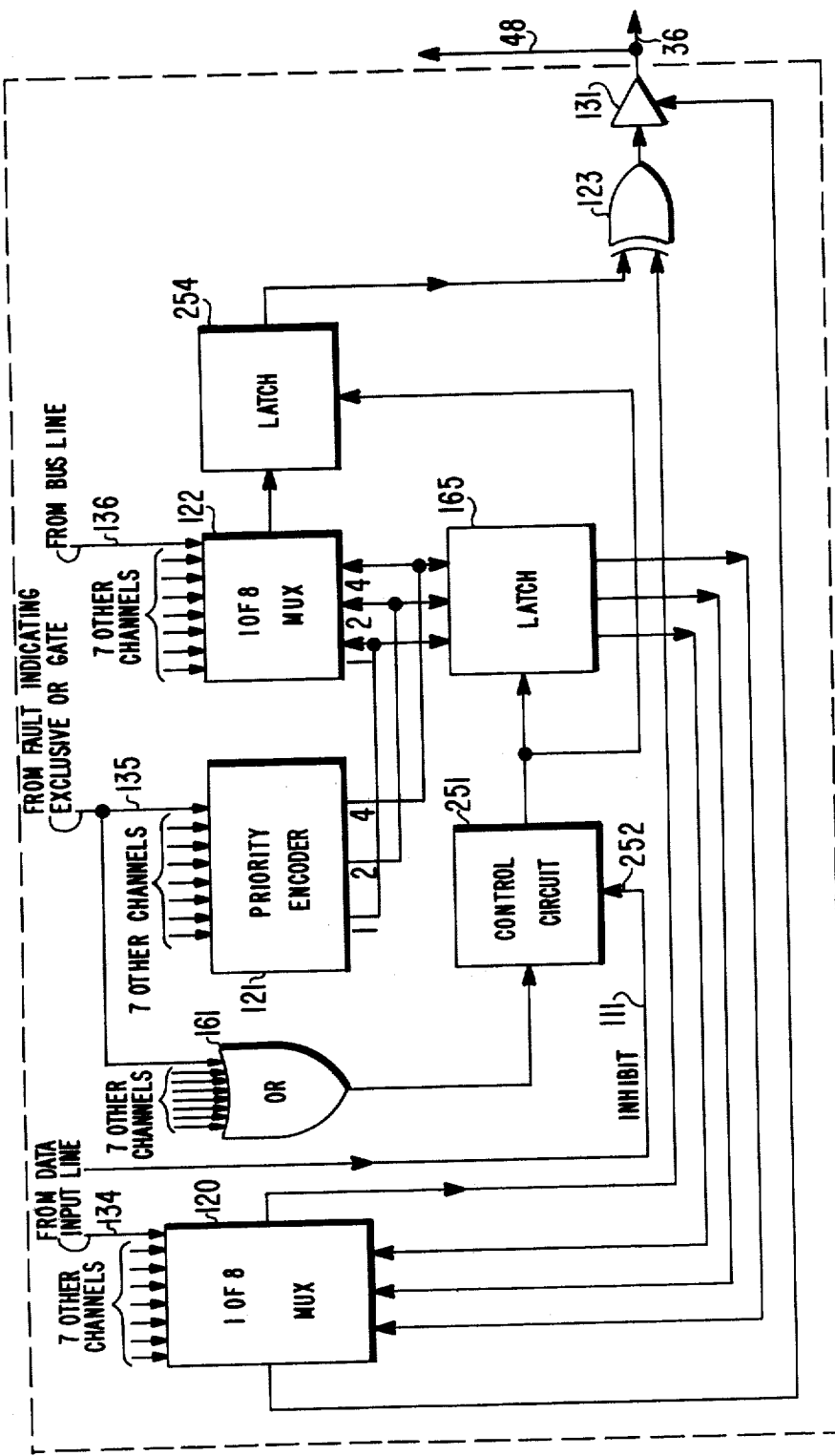
FIG. 6 shows yet another form of the invention.

Such an arrangement is shown in FIG. 6 which would take the place of the structure within the dotted block 125 of FIG. 5. Corresponding components and leads of FIG. 6 and FIG. 5 are identified by the same reference character.

In FIG. 6 the priority encoder 121 functions to detect a fault as discussed in FIG. 5 and supplies the identification of the fault channel to latch 165. The output of latch 165 is supplied to MUX 120 which selects the particular data line or channel in which the fault occurred and supplies the data on that channel to one input of XOR gate 123.

The output of the priority encoder 121 is also supplied to one-of-eight MUX 122 which selects the data bus in the faulty channel and supplies the polarity of the stuck condition to the input of latch 254. Both latches 254 and 165 are enabled by a binary 1 output from OR gate 161 which occurs when the fault occurs and is supplied to a control circuit 251. Control circuit 251, which is inhibited via lead 252 when the circuit is acting as a receiver and is noninhibited when acting as a transmitter, generates a pulse which enables latches 165 and 254 to store the contents of the MUX's 120 and 122, respectively, which are supplied thereto. The output of latch 254 is supplied to the other input of XOR gate 123 so that XOR gate 123 will output a binary 1 each time the fault of the selected channel becomes visible.

Figure 7:
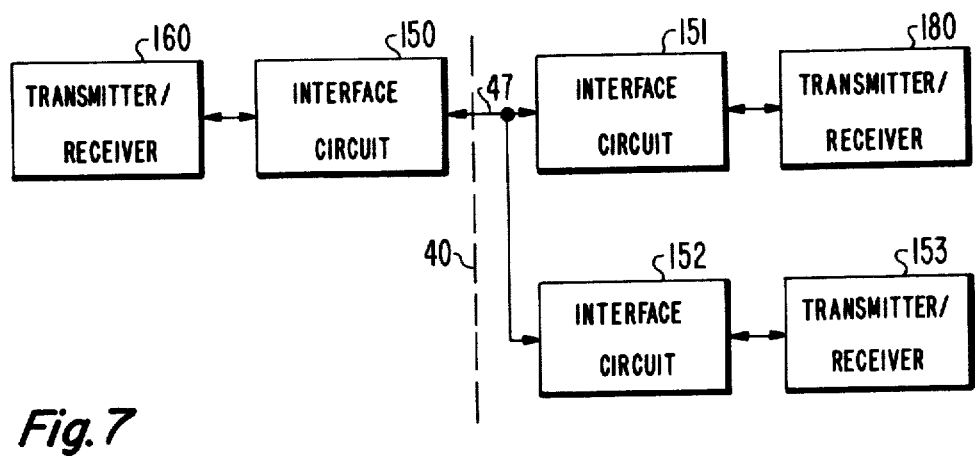
FIG. 7 is a block diagram showing the broad architecture of the structure of FIGS. 4, 5 and 6.

Reference is now made to FIG. 7, which shows how more than two transceivers of the type shown in FIGS. 4 and 5 can be employed in a system. In FIG. 7, transceiver 160 and 180 correspond to transceivers 160 and 180 of FIG. 5 and the interface circuits 150 and 151 correspond to the remainder of the circuit of FIG. 5. More specifically, interface circuit 150 represents the logic associated with the eight data lines of the system located at the site of transceiver 160 and block 151 represents similar logic for the eight data lines of the system located at the site of transceiver 180. A third transceiver 153 can be added to the system either to the right or to the left of the vertical dotted line 40. It is only important that it be connected to common bus lines such as bus line 47. Transceiver 153 can be identical to transceivers 160 and 180 and interface circuit 152 can be identical to interface circuits 150 and 151. The interface circuit 152 is located at the site of the third transceiver 153 which can be at a location different from either transceiver 160 or 180.

The foregoing descriptions have all been predicated on the assumption that the "stuck" condition of a bus line causes it to be at, or very nearly at the nominal high or nominal low level for the applicable logic convention. Such would be true for a short-circuit to ground or to the +5 volt power supply bus in a circuit which for example defines a logic high level as being near +5.0 volts and a logic low level as being near 0.0 volts. However, the stuck condition may be the result of a tri-state bus-line driver amplifier failing to assume a high impedance when it should be in the "disabled" state. If another, similar, driver amplifier then attempts to drive the bus line to the opposite logic level, the bus line stuck condition may be manifested as an intermediate voltage, such as +2.5 volts in the present example.

The circuits of FIGS. 1, 4 and 5 might, or might not detect such intermediate voltage stuck condition, depending on the exact logic threshold voltage at input 58 of XOR gate 17.

If certainty of detection of such conditions is desired, the present invention may be modified to include a bias, or threshold voltage offset in the circuits which senses the actual logic levels of the bus lines.

Figure 8:
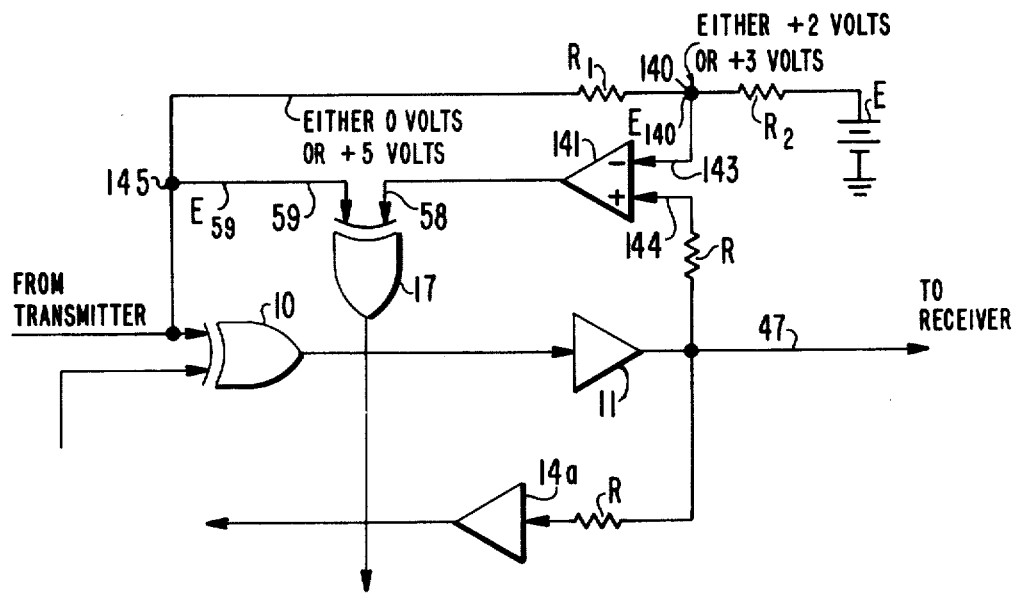
FIG. 8 is a logic diagram showing a modification of the circuits of FIGS. 1, 4 and 5.

One embodiment of such logic or circuit means is shown in FIG. 8 and can be incorporated in any of the prior circuits discussed herein.

In FIG. 8, a portion of the circuit of FIG. 4 is shown, including XOR gate 10, amplifier 11, XOR gate 17, and amplifier 14a. Also shown are two isolating resistors R.

Additional circuit means include resistors R1 and R2 which together with voltage source E form a voltage divider to create a reference voltage level $E_{140}$ at junction 140. This reference voltage will have one of two different values depending upon whether the input signal level $E_{59}$ of XOR gate 10 which is connected to end junction 145 of said voltage divider is a high level or a low level. For example, reference level $E_{140}$ may be +3.0 volts whenever gate 10 input, $E_{59}$, is high (+5.0 volts), and may be +2.0 volts whenever $E_{59}$ is low (0.0 volts). The junction 140 of the voltage divider is supplied to the negative input terminal of difference amplifier 141. The potential of bus line 47 is supplied to the positive input terminal 144 of difference amplifier 141 through isolating resistor R.

Difference amplifier 141 of FIG. 8 compares the voltage on bus line 47 with reference voltage level $E_{140}$. Whenever the voltage on bus line 47 is more positive than the reference voltage, the difference amplifier outputs a high logic level on line 58 to XOR gate 17. Conversely, whenever the voltage on bus line 47 is less positive (or more negative) than the reference voltage $E_{140}$, the difference amplifier outputs a low logic level. The shift in reference level $E_{140}$ is such that the presence of an intermediate voltage stuck condition on bus line 47 will cause the two inputs of XOR gate 17 to be different, and thereby the stuck condition will be detected, as previously described.

Specifically, in the above example, whenever the output of XOR 10 is high the voltage on bus line 47 must be more positive than +3.0 volts for XOR gate 17 to have a high level on both inputs, and thereby output a low level signifying the absence of a stuck condition. If bus line 47 is stuck low at 0.0 volts, or is stuck at an intermediate voltage less than +2.5 volts, amplifier 141 will output a low level on line 58, and XOR gate 17 will output a high level signifying the detection of the stuck condition.

Furthermore, in the example, whenever XOR gate 10 outputs a low level, the voltage on bus line 47 must be less positive than +2.0 volts in order for XOR gate 17 to have a low level at both inputs, and thereby output a low level, signifying absence of a stuck condition. If bus line 47 is stuck high at +5.0 volts, or at an intermediate voltage greater than +2.5 volts, amplifier 141 will output a high level on line 58 and XOR gate 17 will output a high level signifying the detection of the stuck condition.

What is claimed is:

1. In a system comprising a transmitter for generating N data signals each having first and second logic levels, a receiver for receiving said N signals and N data channels each comprising bus means for transmitting said N signals, a circuit means for detecting and correcting a stuck signal level condition on one of said bus means and comprising in each data channel;

first and second Exclusive OR gate means each having first and second input means and an output means;

means for supplying one of said data signals to said first input means of said first Exclusive OR gate means and for supplying the output of said second Exclusive OR gate means to said receiver; and bus means connecting the output means of said first Exclusive OR gate means to the first input means of said second Exclusive OR gate means; and logic means responsive to equal signal logic levels of said bus means and said data signals of all of said data channels to supply said first signal logic level to the second input terminals of said first and second Exclusive OR gate means and responsive to unequal signal levels of said bus means and said data signals of any of said data channels to supply said second signal logic level to said second input terminals of said first and second Exclusive OR gate means.

2. A system as in claim 1 in which said logic means comprises:

a plurality of third Exclusive OR gate means each having third and fourth input means connected respectively to said first input means of the first Exclusive OR gate means of each data line and to the said bus means of each data channel and further comprising second output means;

OR gate means having a plurality of input terminals and an output terminal;

means for connecting said second output means of each of said third Exclusive OR gate means to one of said input terminals of said OR gate means; and means for connecting the output of said OR gate means to the said second input means of said first and second Exclusive OR gate means.

3. A system as in claim 2 and further comprising:

signal amplitude correcting means responsive to a data signal of said first level and a predetermined first range of signal levels of said bus means to produce an amplitude corrected signal of said first level and responsive to a data signal of said first level and a signal level on said bus means which lies outside said first range of signal levels to produce an amplitude corrected signal of said second level;

said signal amplitude correcting means further responsive to a data signal of said second level and a predetermined second range of signal levels of said bus means to produce an amplitude corrected signal of said second level and responsive to a data signal of said second level and a signal level on said bus means which lies outside said second range of signal levels to produce an amplitude corrected signal of said first level;

said third Exclusive OR gate means responsive to equality or inequality of said data signal and the amplitude corrected signal to produce signals of said first and second logic levels, respectively.

4. A system as in claim 1 in which said logic means comprises:

a plurality of third Exclusive OR gate means, each having third and fourth input means and an output means;

means for connecting said first input means of said first Exclusive OR gate means and said bus means, respectively, of each data channel, to said third and fourth input means of said third Exclusive OR gate means;

said third Exclusive OR gate means responsive to the equality or inequality of the level of the data signal supplied to said each data channel and the signal level of said bus means of said each data channel to produce output signals of said first and second logic levels respectively;

priority encoding means responsive to the output signals from all of said third Exclusive OR gate means to produce a signal identifying, in a predetermined order of priority, which of two or more of said third Exclusive OR gate means is producing an output signal of said second level;

fourth Exclusive OR gate means having fifth and sixth input means and a third output means;

first gating means responsive to all of the data signals supplied to said data channels and to the output of said priority encoding means to gate the data signal supplied to said identified third Exclusive OR gate means to the fifth input means of said fourth Exclusive OR gate means;

second gating means responsive to the level of the signals on all of said bus means of all of said data channels and to the output of said priority encoding means to gate the signal level of the bus means which supplied its signal level to the identified third Exclusive OR gate means to the sixth input means of said fourth Exclusive OR gate means; and means for supplying the output of said fourth Exclusive OR gate means to the second input means of said first and second Exclusive OR gate means of each of said data channels.

5. A system as in claim 1 and further comprising means for overriding said first logic means to supply said first signal logic level to the second input terminals of all of said first and second Exclusive OR gate means during each data signal change.

6. In a system comprising a transmitter for generating N data signals having first and second logic levels and a receiver for receiving said N signals, N data channels connecting said transmitter to said receiver and each comprising:

first and second Exclusive OR gates each having first and second input means and an output means;

means for supplying a data signal to said first input means of said first Exclusive OR gate and for supplying the output of said second Exclusive OR gate to said receiver; and bus means connecting the output means of said first Exclusive OR gate to the first input means of said second Exclusive OR gate;

first logic means responsive to equal signal logic levels of said bus means and said data signals of all of said data channels and to unequal signal logic levels of said bus means and said data means of any of said data channels to supply said first and second signal logic levels respectively to the second input means of said first and second Exclusive OR gates.

7. A system as in claim 6 in which said logic means comprises:

a plurality of third Exclusive OR gates each having third and fourth input means connected respectively to said first input means of the first Exclusive OR gate of each data channel and to the said bus means of each data channel and further comprising second output means;

OR gate means having a plurality of input terminals and an output terminal;

means for connecting said second output means of each of said third Exclusive OR gates to one of said input terminals of said OR gate means; and means for connecting the output of said OR gate means to the said second input means of said first and second Exclusive OR gates.

8. A system as in claim 7 and further comprising:

signal amplitude correcting means responsive to a data signal of said first level and a predetermined first range of signal levels of said bus means to produce an amplitude corrected signal of said first level and responsive to a data signal of said first level and a signal level on said bus means which lies outside said first range of signal levels to produce an amplitude corrected signal of said second level;

said signal amplitude correcting means further responsive to a data signal of said second level and a predetermined second range of signal levels of said bus means to produce an amplitude corrected signal of said second level and responsive to a data signal of said second level and a signal level on said bus means which lies outside said second range of signal levels to produce an amplitude corrected signal of said first level;

said third Exclusive OR gate means responsive to equality or inequality of said data signal and the amplitude corrected signal to produce signals of said first and second logic levels, respectively.

9. A system as in claim 6 in which said logic means comprises:

a plurality of third Exclusive OR gates, each having third and fourth input means and second output means;

means for connecting said first input means of said first Exclusive OR gate and said bus means, respectively, of each data channel, to said third and fourth input means of said third Exclusive OR gate;

said third Exclusive OR gate responsive to the equality or inequality of the level of the data signal supplied to said each data channel and the signal level of said bus means of said each data channel to produce output signals of said first and second logic levels, respectively;

priority encoding means responsive to the output signals from all of said third Exclusive OR gates to produce a signal identifying, in a predetermined order of priority, which of two or more of said third Exclusive OR gates is producing an output signal of said second level;

fourth Exclusive OR gate means having fifth and sixth input means and a second output means;

first gating means responsive to all of the data signals supplied to said data channels and to the output of said priority encoding means to gate the data signal supplied to said identified third Exclusive OR gate to the fifth input means of said fourth Exclusive OR gate;

second gating means responsive to the level of the signals on all of said bus means of all of said data channels and to the output of said priority encoding means to gate the signal level of the bus means which supplied its signal level to the identified third Exclusive OR gate to the sixth input means of said fourth Exclusive OR gate;

means for supplying the output of said fourth Exclusive OR gate to the second input means of said first and second Exclusive OR gate of each of said data channels.

10. A system as in claim 6 and further comprising means for overriding said logic means to supply said first signal logic level to the second input terminals of all of said first and second Exclusive OR gates during each data signal change.

* * * * *